US011890877B2

(12) United States Patent
Cummins et al.

(10) Patent No.: US 11,890,877 B2
(45) Date of Patent: **\*Feb. 6, 2024**

(54) FOOD PRODUCT PLATFORM FOR FOOD PRODUCT PRINTER

(71) Applicant: Primera Technology, Inc., Plymouth, MN (US)

(72) Inventors: Robert P. Cummins, Deephaven, MN (US); Todd Britz, Maple Grove, MN (US); Erick Hagstrom, Wayzata, MN (US)

(73) Assignee: Primera Technology, Inc., Plymouth, MN (US)

(*) Notice: Subject to any disclaimer, the term of this patent is extended or adjusted under 35 U.S.C. 154(b) by 537 days.

This patent is subject to a terminal disclaimer.

(21) Appl. No.: 16/985,830

(22) Filed: Aug. 5, 2020

(65) Prior Publication Data

US 2021/0059289 A1 Mar. 4, 2021

Related U.S. Application Data

(60) Provisional application No. 62/894,323, filed on Aug. 30, 2019.

(51) Int. Cl.
*B41J 2/175* (2006.01)
*B41J 2/17* (2006.01)
(Continued)

(52) U.S. Cl.
CPC .......... *B41J 2/17563* (2013.01); *A21D 13/24* (2017.01); *A21D 13/80* (2017.01); *A23P 20/18* (2016.08);
(Continued)

(58) Field of Classification Search
CPC ... B29C 64/00; A23P 2020/253; B41J 3/4073; B41J 3/40731; B41J 13/0009; B41M 5/0047
See application file for complete search history.

(56) References Cited

U.S. PATENT DOCUMENTS

| 4,339,993 A | 7/1982 | Lee |
| 4,981,074 A | 1/1991 | Machita et al. |

(Continued)

FOREIGN PATENT DOCUMENTS

| CN | 1868754 A | 11/2006 |
| CN | 201325212 Y | 10/2009 |

(Continued)

OTHER PUBLICATIONS

Search Report issued for related EP patent application serial No. 20856725.5, dated Oct. 4, 2022.
(Continued)

*Primary Examiner* — Michael M. Robinson
(74) *Attorney, Agent, or Firm* — Westman, Champlin & Koehler, P.A.; Z. Peter Sawicki; Amanda M. Prose (57) ABSTRACT

A food product platform, system and method for supporting a food product thereon during printing. The platform has a first surface for supporting the food product thereon, the first surface having a surface topography configured to securely support the food product thereon; and a second surface supporting an attachment mechanism for removably coupling to a reciprocal attachment mechanism on a receiving arm of a printer, wherein the attachment mechanism prevents movement of the platform with respect to the receiving arm when coupled to the receiving arm. The food product platform is removably connectable to the receiving arm manually and without the use of tools.

6 Claims, 7 Drawing Sheets

(51) Int. Cl.
| | |
|---|---|
| *A23P 20/18* | (2016.01) |
| *B41J 3/407* | (2006.01) |
| *B41J 29/02* | (2006.01) |
| *A23P 20/20* | (2016.01) |
| *B41J 13/00* | (2006.01) |
| *B41M 5/00* | (2006.01) |
| *A21D 13/80* | (2017.01) |
| *A21D 13/24* | (2017.01) |
| *B41J 29/17* | (2006.01) |
| *B29C 64/00* | (2017.01) |
| *A23P 20/25* | (2016.01) |

(52) U.S. Cl.
CPC .............. *A23P 20/20* (2016.08); *B29C 64/00* (2017.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,505,775 | A | 4/1996 | Kitos |
| 5,795,395 | A | 8/1998 | Ben-Matitayhu et al. |
| 5,988,787 | A | 11/1999 | Watanabe et al. |
| 2004/0114192 | A1 | 6/2004 | Jensen |
| 2006/0119628 | A1 | 6/2006 | Kofman et al. |
| 2009/0021548 | A1 | 1/2009 | Suzuki et al. |
| 2010/0091054 | A1* | 4/2010 | Vesanto ................ B41J 3/4073 347/104 |
| 2011/0025735 | A1 | 2/2011 | Nohilly et al. |
| 2012/0141636 | A1 | 6/2012 | Ackley, Jr. et al. |
| 2018/0338519 | A1* | 11/2018 | Albert .................... A23P 20/25 |

FOREIGN PATENT DOCUMENTS

| | | |
|---|---|---|
| CN | 105346266 A | 2/2016 |
| CN | 207128411 U | 3/2018 |
| EP | 0183611 A2 | 6/1986 |
| EP | 2738119 A1 | 6/2014 |
| EP | 3332978 A1 | 6/2018 |
| JP | 5346728 A | 12/1993 |
| JP | 2005327918 A | 11/2005 |
| JP | 2007136729 A | 6/2007 |
| JP | 2013078894 A | 5/2013 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |

OTHER PUBLICATIONS

International Search Report issued for PCT/US2020/048406, dated Nov. 26, 2020.
Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.

* cited by examiner

FOOD PRODUCT PLATFORM FOR FOOD PRODUCT PRINTER

CROSS-REFERENCE TO RELATED APPLICATION

The present application claims priority to and the benefit of U.S. provisional application Ser. No. 62/894,323, filed on Aug. 30, 2019, the content of which is hereby incorporated in its entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, and printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to a printing system for printing images or content with edible ink on a surface of an edible food product, the system configured for use with an interchangeable food product platform.

In one or more embodiments, an interchangeable food product platform supports a food product thereon. The platform has a first surface for supporting the food product thereon, the first surface having a surface topography configured to securely support the food product thereon. A second surface has an attachment mechanism for removably coupling to a reciprocal attachment mechanism on a receiving arm of a printer. The attachment mechanism prevents movement of the platform with respect to the receiving arm when coupled to the receiving arm.

The respective attachment mechanisms are configured to engage and disengage with one another to couple the platform to the arm manually.

In one or more embodiments, the attachment mechanism has one or more tabs extending outwardly from the second surface and a support wall opposite the one or more tabs providing a space therebetween for receiving the reciprocal attachment mechanism on the receiving arm. The wall extending outwardly from the bottom surface of the platform terminates in a lip extending into the space between the wall and the one or more tabs. The one or more tabs extend a first distance outwardly from the bottom surface of the platform and the wall extends a second distance outwardly from the bottom surface and wherein the second distance is greater than the first distance.

The platform further comprises a support wall having a plurality of raised sections spaced apart on a surface of the support wall, the support wall further comprising one or more tabs for guiding and securing the platform to the receiving arm and the support wall terminating in a lip portion wherein the plurality of raised sections, one or more tabs, the lip portion, or a combination thereof secure the platform to the receiving arm.

The platform also has a protrusion located on a rear portion of the second surface which corresponds to a notch in the receiving arm and the protrusion is configured to secure the platform to the receiving arm.

In one or more embodiments, the platform is comprised of a food grade plastic or metal material.

In one or more embodiments, the surface topography of the first surface comprises a plurality of protrusions positioned along at least a portion of the first surface.

Another aspect of the present disclosure relates to a system for printing on a surface of a plurality of food products. The system includes a printer configured to print on a food product surface and a receiving arm supported by the printer and extendable and retractable across a path of a print head of the printer and positioned to extend from the printer and retract into the printer to receive one of the plurality of food products and deliver one of the plurality of food products to a position below the print head and to return the one of the plurality of food products after the food product has been printed on. One or more interchangeable platforms are removably connectable with the receiving arm and the one or more platforms each have a food product support surface such that the one or more platforms provide interchangeable food product support surfaces to the printer. Where more than one platform is provided the platforms have the same or different dimensions, surface topographies, or combinations thereof.

The one or more platforms have an attachment mechanism configured to prevent movement of the platform with respect to the receiving arm when connected to the receiving arm and as the receiving arm extends and retracts laterally with respect to the printer to retain the food product supported on the platform.

In one or more embodiments, the one or more platforms are removably secured to the receiving by way of a clip mechanism.

In one or more embodiments, the one or more platforms each have one or more tabs and a wall opposite the one or more tabs with a space between the one or more tabs and the wall, the space having dimensions sufficient to receive the receiving arm therein and wherein the one or more tabs and the wall securely support the platform on the receiving arm such that the platform moves with the receiving arm.

In one or more embodiments, the food product support surface comprises a substantially non-smooth surface on at least a portion of the food product support surface for holding food product thereon during extension and retraction of the platform when connected to the receiving arm.

In one or more embodiments, the food product support surface is constructed from a food grade material comprising a metal such as stainless steel, or a plastic material.

In one or more embodiments, the plurality of food products are edible elements having a substantially flat surface, cookies, frosting sheets, rice paper, or combinations thereof.

Yet another aspect of the present disclosure relates to a method of automatically printing on a selected plurality of food products by selecting a food product platform for supporting at least one food product thereon and removably coupling the food product platform to a moveable receiving arm such that the food product platform is movable with the receiving arm but stationary with respect to its connection with the receiving arm. Printing includes extending the receiving arm supported by a printer towards a delivery tray for removing at least one food product from a first support surface of the delivery tray and retracting the receiving arm into the printer for positioning the food product below a print head of the printer. Content is then printed directly on a surface of the food product. Extending the receiving arm supported by the printer towards the delivery tray returns the at least one food product to the delivery tray after printing and advancing the delivery tray to a second support surface of the delivery tray supporting a second food product.

In one or more embodiments, the food product platform is a first food product platform and printing on a variety of food products includes selecting a second food product platform having at least one of different dimensions or surface topography from the first food product platform. The first food product platform is removed from connection with the receiving arm and the second food product platform removably coupled to the moveable receiving arm such that the second food product platform is movable with the receiving arm but stationary with respect to its connection with the receiving arm. Then the receiving arm is extended towards the delivery tray for removing a subsequent at least one food product from the delivery tray wherein the subsequent at least one food product is different in size, type, construction or combination thereof from the previous at least one food product. The receiving arm is then retracted into the printer for positioning the subsequent at least one food product below a print head of the printer and content printed directly on a surface of the subsequent at least one food product.

DETAILED DESCRIPTION

A food product printing system of the present disclosure includes a printer system for printing an image on a surface of the food product. The print surface may be an actual surface of the food product itself. The printer system comprises a printer configured to support a food product platform, which can be removably secured to a receiving arm of the printer, and a delivery tray supported on a base. The system may also be provided with a plurality of different food product platforms, which are interchangeable for selected use with the receiving arm. The printer system is configured for continuous printing of a varied number of food products, and/or for food products of different or specific dimensions.

The food product platform is a removably connectable platform for operably connecting to the receiving arm such that the food product platform is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions in order to continuously and automatically deliver a plurality of food items sequentially to the receiving arm.

The interchangeable food product platforms allow the receiving arm to be quickly converted to handle food products of different sizes, shapes, and types. In one embodiment, each of the food product platforms are configured to snap onto the receiving arm without tools and mount without free play, where free play could diminish print quality when the surface of the food product is printed on. One or more food product platforms may also include surface protrusions or other textures and topography in addition to flat or smooth outer surfaces. For example, a food product platform comprises a plurality of surface spikes which extend to provide grip to further securely support a food product on the food product platform and to keep the food product from moving during printing or transport on the receiving arm. In such an embodiment, the spikes are shaped to grip food products, yet allow for easy cleaning, which is imperative for a product that handles food.

The textures on a food product supporting surface of the food product platform may extend substantially along the entire surface of the food product platform, or for example, along a perimeter, in a center portion thereof, or otherwise spaced apart along the surface and combinations thereof.

One embodiment of the printing system 10 is illustrated generally in FIGS. 1-7. The printing system 10 is configured to receive a food product 12 from a delivery tray 22, to print on a surface of the food product 12 and return the food product 12 to the delivery tray 22. The system is also configured to do so automatically and continuously for a pre-determined number of food products 12. The system 10 comprises a printer 14 having a print head 16 and nozzles (not shown) wherein the print head 16 and nozzle are configured for printing with edible ink. The print head 16 can be a carriage for an ink cartridge where the ink cartridge may be filled with edible printer ink. The printer 14 also supports an extendable and retractable receiving arm 20 therein.

The receiving arm 20 is operably connected to a power source within the printer 14. The receiving arm 20 is extendable and retractable with respect to the position of the path of the print head 16. The receiving arm 20 has a first end 21 and a second opposing end 23 and a support length 25 extending therebetween. The first end 21 is operably connected to a mechanism for retracting and extending the arm 20. The second end 23 and at least a portion of the support length 25 of the receiving arm 20 are configured for extending outwardly from the printer 14.

When extended, the receiving arm 20 and food product platform 120 removably coupled thereto, also referred to hereinafter collectively as the receiving arm 20, may receive a food product, hold a food product, and/or return a printed food product to the delivery tray 22. The receiving arm 20 also holds or supports the food product within the printer 14 and during printing on the surface of the food product 12.

As illustrated in FIGS. 5A to 6D, in one embodiment, each food product platform 120 is configured to operably couple to or otherwise securely attach to the receiving arm 20. In the embodiment illustrated, the support length 25 of the receiving arm 20 comprises a vertical wall to which the food product platform 120 is connected and supported by. A bottom surface 122 of the food product platform 120 comprises a connection mechanism 124 for coupling to the support length 25. The connection mechanism 124 may comprise a plurality of downwardly protruding tabs or walls 126 that are spaced apart along a length of the platform 120 and a support wall 128 terminating in lower lip 130 extending from the support wall 128.

Figure 1:
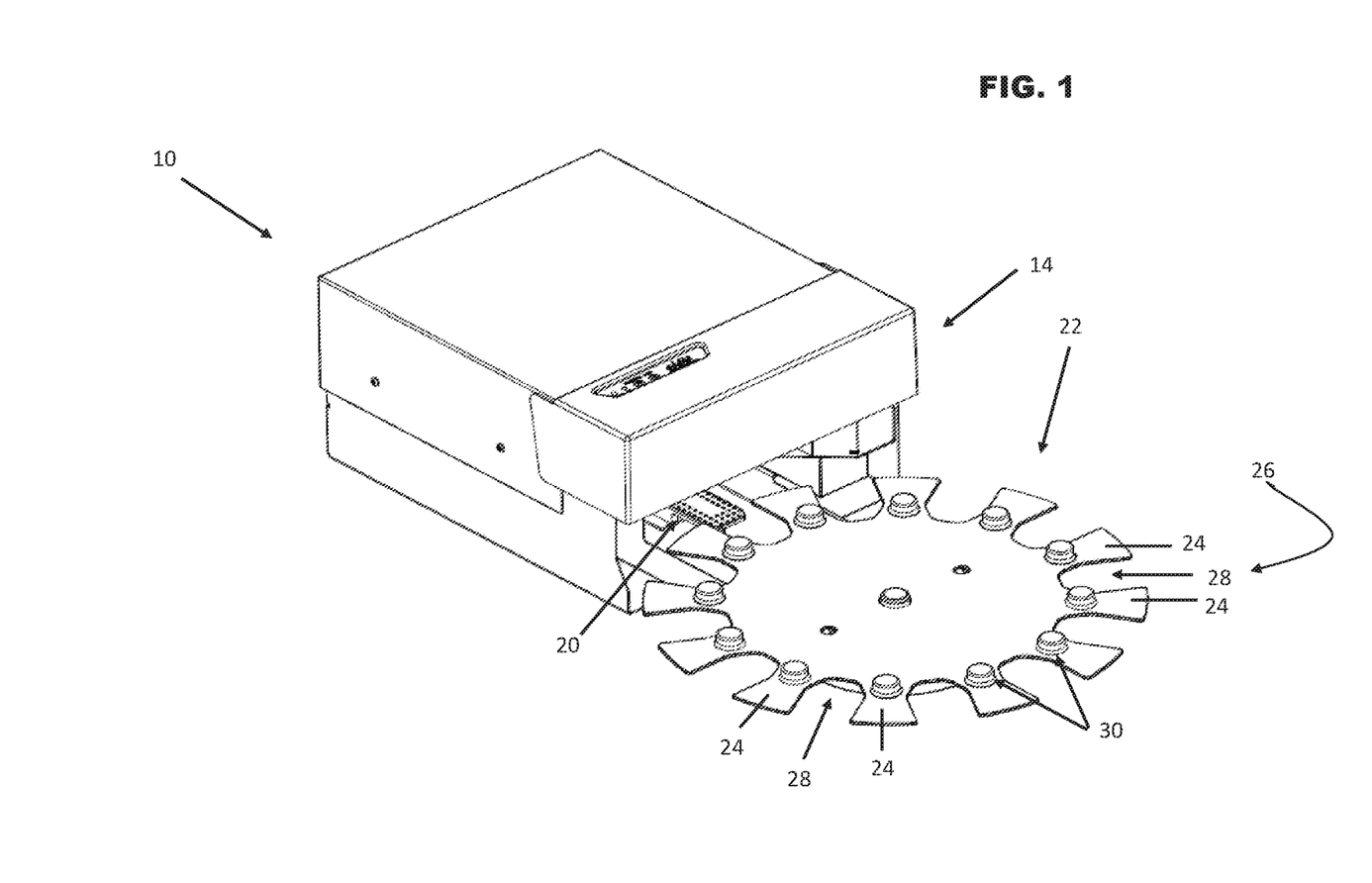
FIG. 1 is a perspective view of a food product printing system.
Figure 2:
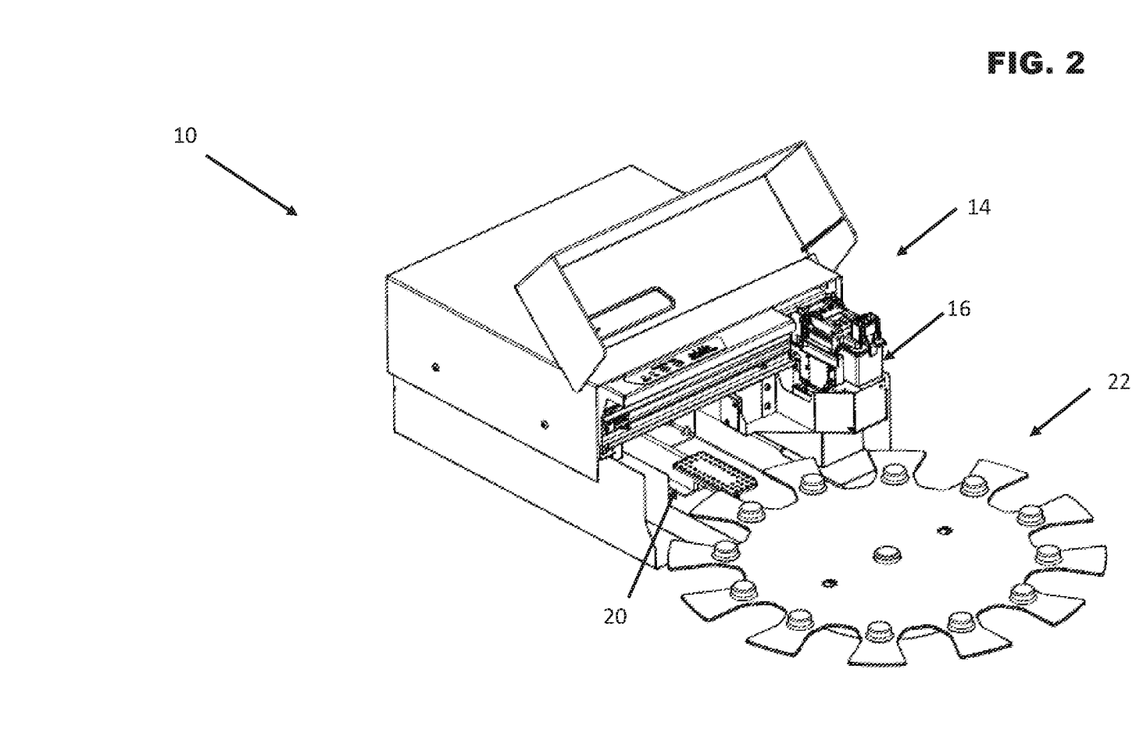
FIG. 2 is a perspective view of a food product printing system with a cover portion opened for exposing interior portions of a printer portion of the system.
Figure 3:
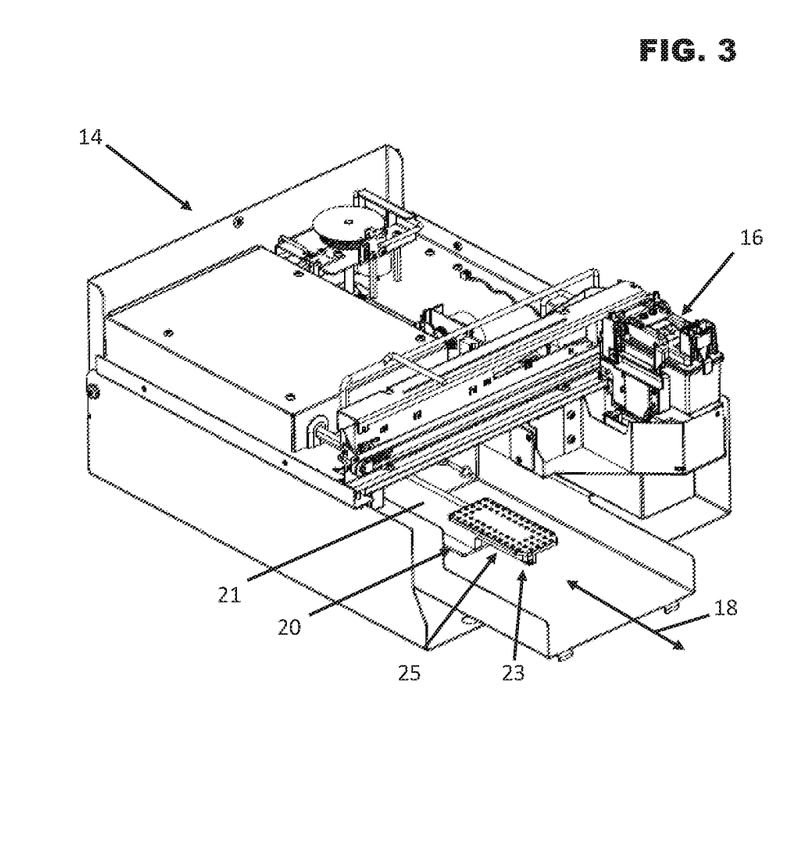
FIG. 3 is a top perspective view of the food product printing system having an automatic delivery tray component removed and a cover of a printer removed.
Figure 4:
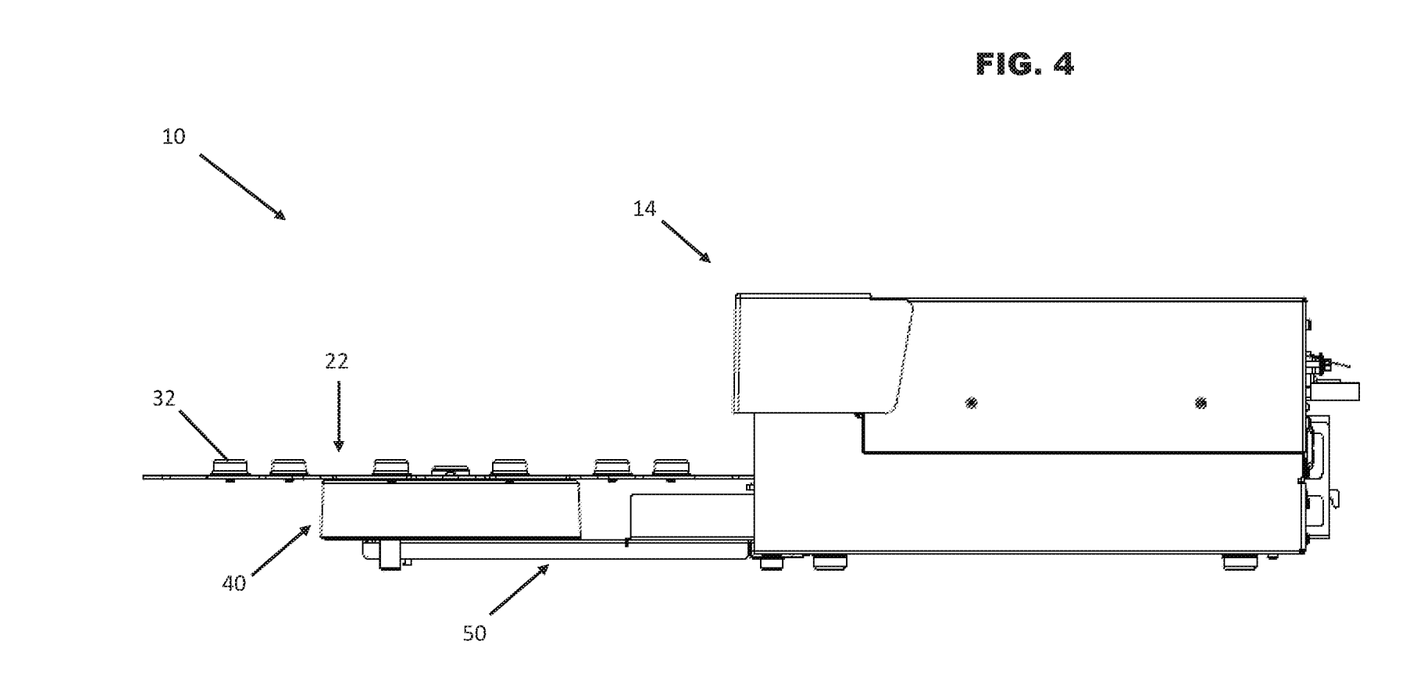
FIG. 4 is a side view of the food product printing system with the automatic delivery tray component removably secured to a tray base portion.
Figure 5A:
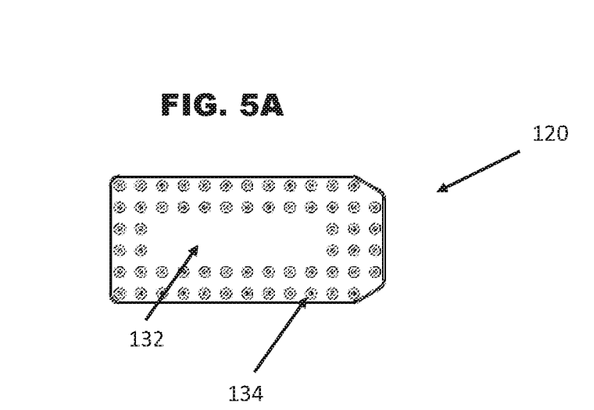
FIG. 5A is a top view of a removable food product platform for a receiving arm.
Figure 5B:
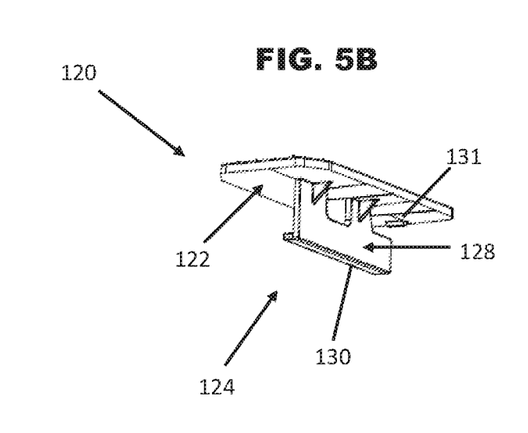
FIG. 5B is a front side perspective view of the removable food product platform.
Figure 5C:
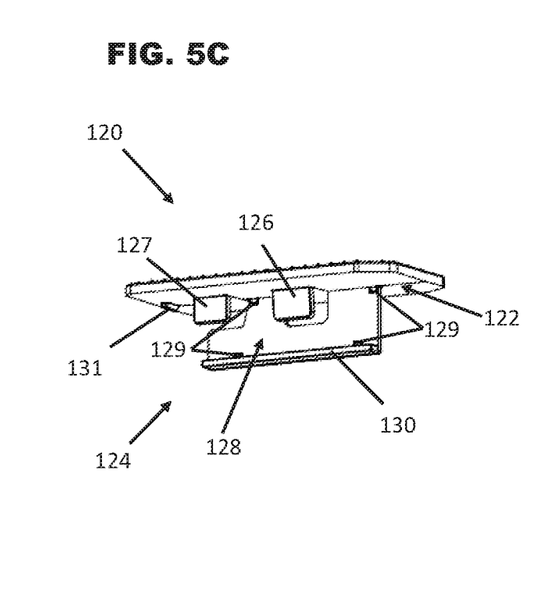
FIG. 5C is a bottom side perspective view of the removable food product platform.

In the embodiment illustrated herein, tab or wall 126 holds or supports the platform 120 on and in connection with the receiving arm 20 and tab or wall 127 provides a mounting guide for installation of the platform 120 on to the receiving arm 20. The tab or wall 127 is a guide 127 which allows a user to easily position and install the platform 120 onto the arm 20. For example, without the guide tab or wall 127, it would be easy to begin sliding the platform 120 onto the arm 20 with the lower lip 130 riding on the side of the arm 20 instead of the bottom. The tab or wall 127 prevents the platform 120 from being installed insecurely and/or at the wrong elevation and/or with a significant cant. Such incorrect or insecure installation would flex the lone securing tab 126 too far and damage it. As such, the guide tab 127 essentially forms a rectangle that is placed over the end of the receiving arm 20 to begin installing the platform 120 thereon. This guarantees the platform 120 begins sliding onto the receiving arm 20 in the correct position.

A surface of the support wall 128 may also be provided with a plurality of raised sections 129 such as pads 129. There may be four pads 129 positioned on the surface of the support wall 128 facing the one or more tabs 126 and guide tab 127. For example, the pads 129 may be provided on upper and lower sections on the forward and rear ends of the wall 128. These pads 129 are configured and positioned to directly contact a side of the receiving arm 20 when mounted thereon. These plurality of pads 129 combine with the securing tab 126, the bottom surface 122, and the lower lip 130 to secure the platform 120 to the receiving arm 20. The securing tab 126 presses into the receiving arm 20 roughly in a middle area of the plurality of pads 129, for example in a middle area of four pads 129 when viewed from the side. This locates the platform 120 on the receiving arm 20 in the X-direction (cartesian coordinate system) and makes the receiving arm 20 rotationally stable around two axes of potential motion and accounts for any minor warping of the platform 120 resulting from construction and/or use of the platform 120 for example, when the platform 120 is constructed of molded plastic. The bottom surface 122 and the lower lip 130 thus contain the platform in the Y-direction, but it is friction between the securing tab 126, the four support pads 129, and the receiving arm 20 that keep the platform from moving in the Y-direction or Z-directions, or rotating around the third potential axis of rotation during printing.

Figure 6A:
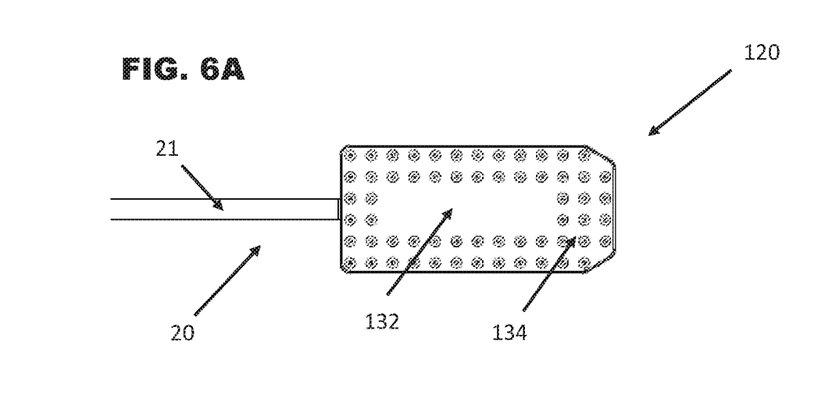
FIG. 6A is a top view of the removable food product platform coupled to the receiving arm.
Figure 6B:
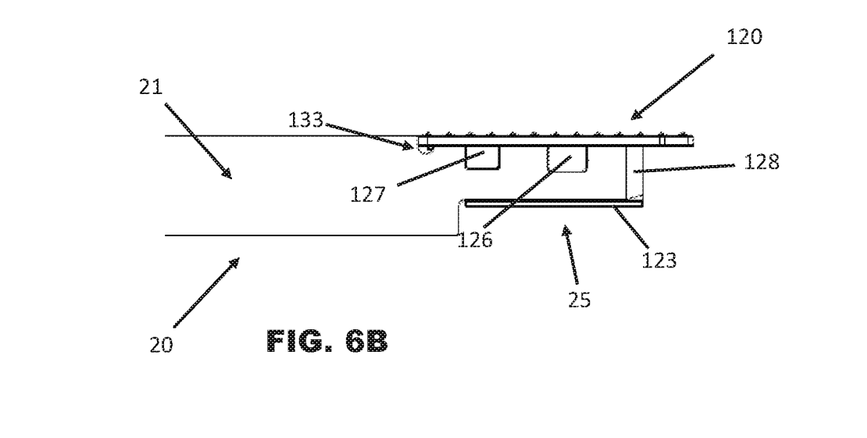
FIG. 6B is a side view of the removable food product platform coupled to the receiving arm.
Figure 6C:
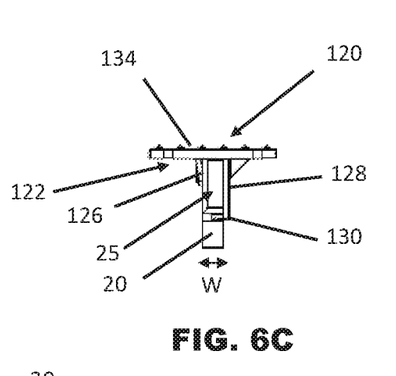
FIG. 6C is a front view of the of the removable food product platform coupled to the receiving arm.
Figure 6D:
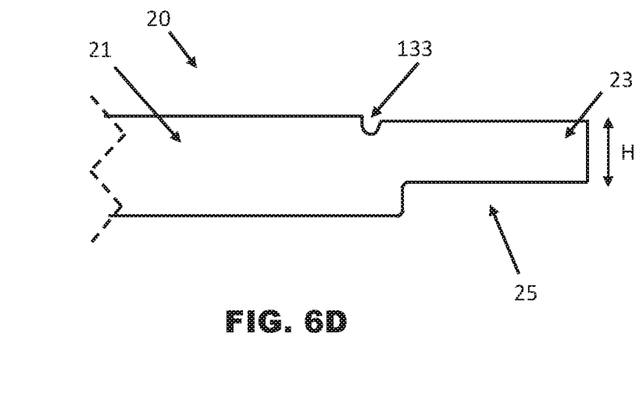
FIG. 6D is a side view of the receiving arm.

Referring to FIG. 6D, the support length 25 provides lateral and vertical support to the platform 120 and is configured for operably supporting the food product platform 120 thereon. For example, the support length 25 has a width W and a height H, where the width W of the support surface is less than the height H of the support length 25. The width of the support length 25 is sufficiently thick to provide stability to the receiving arm and to provide support for the product platform 120 installed thereon but is sufficiently thin enough to provide a friction fit with the connection mechanism 124 of the product platform 120 as described in further detail above. The support length 25 may be oriented as a lateral tab where the support length 25 is then manually slidable, without the use of tools, into connection with the platform 120 in the manner described above in further detail. The receiving arm 20 may be comprised of a food grade metal such as stainless steel or a molded plastic.

There may also be a notch 133 at an upper section of the receiving arm 20 near a back end of the support length 25 or behind the support length 25 on the receiving arm 20 that connects with or otherwise receives a corresponding protrusion 131 on the platform 120 to locate and position the platform 120 on the arm 20 in the Z-direction. The connection of the protrusion 131 into the notch 131 further stabilizes and secures the platform 120 to the receiving arm 20, in addition to the securing tab 126 described above. When the platform 120 is installed on the receiving arm 20, the protrusion 131 on the underside of the platform 120 must be flexed upward as the platform 120 is slid onto the receiving arm 20. The protrusion 131 then drops into the notch 133 and then prevents the platform 120 from sliding back off of the receiving arm 20. The end of the platform 120 butting into a rear or back side of the notch 133 stops the platform from sliding in the opposite direction. A snap action of the protrusion 131 dropping into the notch 133 also alerts to user that the platform 120 is fully installed on the receiving arm 20. As such, these features locate the platform in the Z-direction in a macro sense, and in addition to the friction fit described above, movement in Z-direct is substantially eliminated when the platform 120 is installed on the receiving arm 20. When the protrusion 131 is connected with the notch 133 and the platform 120 connected to the receiving arm 20, the platform is prevented from moving out of place inadvertently, for example, if bumped or dropped during transport.

A top surface 132 of the food product platform 120 may be textured on a portion of the surface 134 which supports a food product 12 thereon or substantially the entire surface 134. As illustrated, spikes may be provided on the top surface 134 to provide traction or grip to the food product platform 120 for holding the food product 12 thereon.

Referring now to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products. The receiving arm 20 moves in a direction perpendicular to the print head path such that the receiving arm 20 extends and retracts across or through the path of the print head 16.

While the receiving arm 20 illustrated herein includes removable food product platforms 120 for coupling to the receiving arm 20, in additional or alternative embodiments, the receiving arm 20 may otherwise have a permanent food support structure incorporated therein. However, the receiving arm 20 of any such embodiments comprises a substantially flat, rectangular support surface which extends towards a holder 26 of the delivery tray 22 in order to engage with and remove the food product 12 from the delivery tray 22 as well as to return printed food products to the delivery tray. The support surface, such as a top surface 132 of the product platform 120, may be substantially flat and having a substantially smooth, textured, or other surface topography. The support surface may also have a geometric shape other than rectangular and which may vary in accordance with selected food product types and dimensions.

The receiving arm 20 extends to receive or return the food product 12 and retracts from the tray 22 into the printer 14 and into a position below the print head 16 for printing. As the food product platform 120 is removably coupled to the receiving arm 20, the food product platform 120 is movable with the receiving arm 20. That is, the food product platform 120 coupled to the receiving arm 20 extends and retracts, as well as raises and lowers with the receiving arm 20. The attachment mechanism 124 for coupling the food product platform 120 to the receiving arm 20 prevents pivoting or other unintentional movement, such as a lateral and vertical movement of the platform 120 with respect to the receiving arm 20. Thus, the attachment is secure and retains the platform 120 in an installation position with respect to the receiving arm 20 in an easily removable manner.

Once content is printed on a food product 12, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20, and the food product platform 120, are then retracted to the printing position with the food product 12 thereon. This process continues on continuously and automatically until a predetermined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items.

Figure 7:
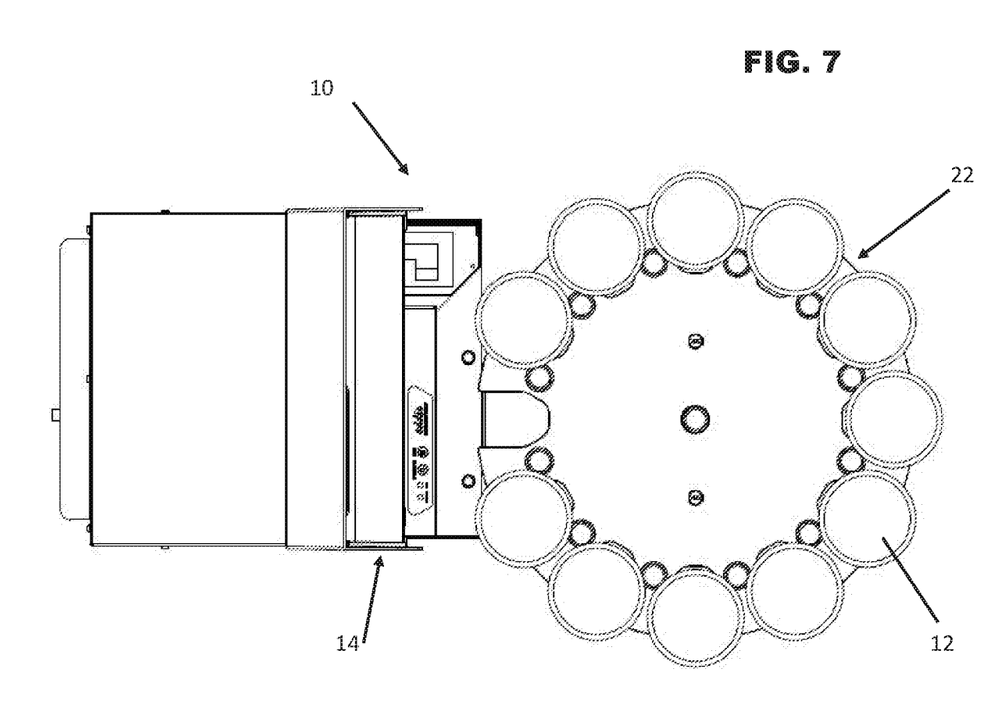
FIG. 7 is a top view of the food product printing system with food product for printing loaded thereon.

In the embodiment illustrated in FIG. 7, the food product 12 is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilized in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A system for printing on a surface of a plurality of food products, the system comprising:
    a printer configured to print on a food product surface;
    a receiving arm supported by the printer and extendable and retractable across a path of a print head of the printer and positioned to extend from the printer and retract into the printer to receive one of the plurality of food products and deliver one of the plurality of food products to a position below the print head and to return the one of the plurality of food products after the food product has been printed on; and
    one or more platforms removably connectable with the receiving arm and the one or more platforms each having a food product support surface such that the one or more platforms provide interchangeable food product support surfaces and where more than one platform is provided the platforms have the same or different dimensions, surface topographies, or combinations thereof, and
    wherein the one or more platforms each comprise one or more tabs and a wall opposite the one or more tabs with a space between the one or more tabs and the wall, the space having dimensions sufficient to receive the receiving arm therein and wherein the one or more tabs and the wall securely support the platform on the receiving arm such that the platform is movable with a receiving arm movement.

2. The system of claim 1 wherein the one or more platforms comprise an attachment mechanism configured to prevent movement of the platform with respect to the receiving arm when connected to the receiving arm and as the receiving arm extends and retracts with respect to the printer to retain the food product supported on the platform.

3. The system of claim 1 wherein the one or more platforms are removably secured to the receiving by way of a clip mechanism such that the platforms are removably secured without the use of tools.

4. The system of claim 1 wherein the food product support surface comprises a substantially non-smooth surface on at least a portion of the food product support surface for holding food product thereon during extension and retraction of the platform when connected to the receiving arm.

5. The system of claim 1, wherein the food product support surface is constructed from a food grade material comprising a metal such as stainless steel, or a plastic material.

6. The system of claim 1, wherein the plurality of food products are edible elements having a substantially flat surface for printing thereon, cookies, frosting sheets, rice paper, or combinations thereof.

* * * * *